April 14, 1936.  R. J. WITTMER  2,037,188
RESILIENT CAR WHEEL
Filed Nov. 3, 1931  2 Sheets-Sheet 1
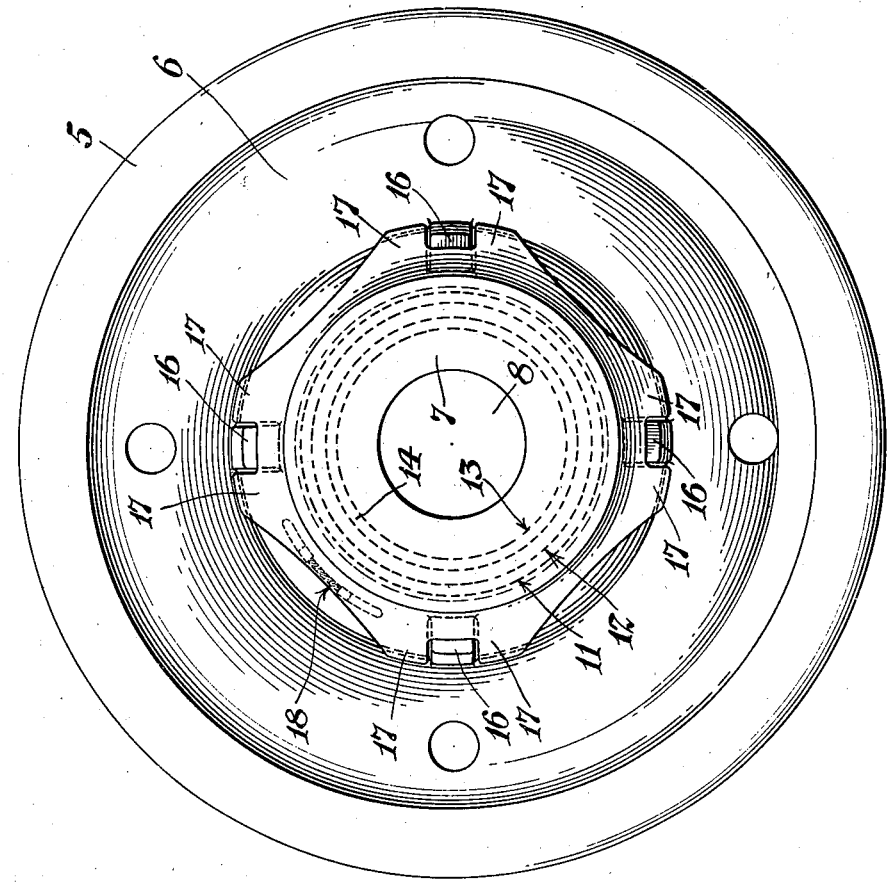
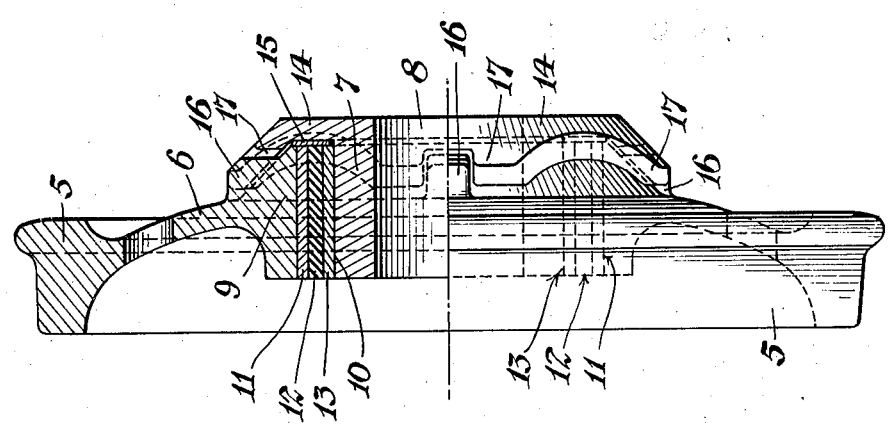
INVENTOR-
Russell J. Wittmer
BY
Clarence B. Kerr
ATTORNEY- April 14, 1936.  R. J. WITTMER  2,037,188
RESILIENT CAR WHEEL
Filed Nov. 3, 1931   2 Sheets-Sheet 2
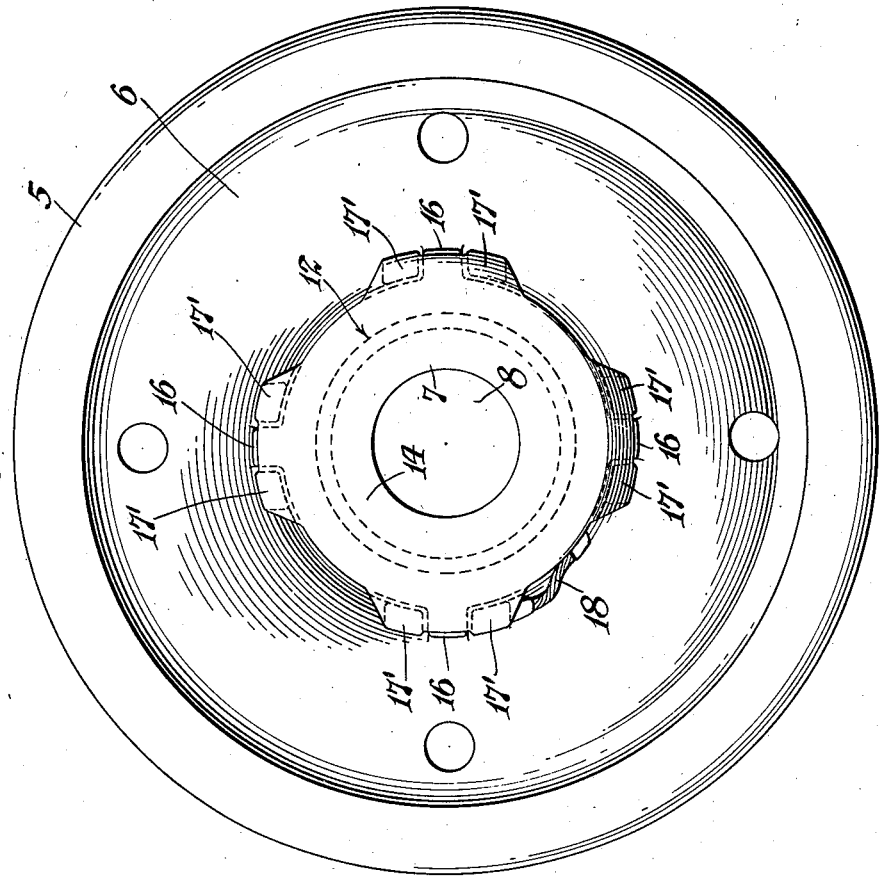
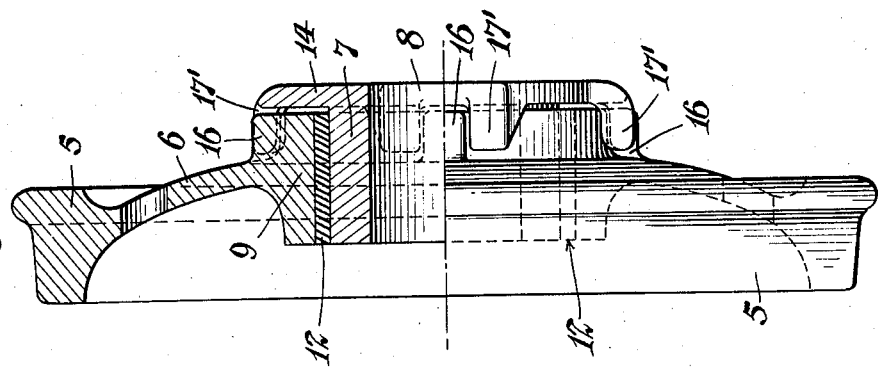
INVENTOR-
Russell J. Wittmer
BY
ATTORNEY- Patented Apr. 14, 1936

2,037,188

UNITED STATES PATENT OFFICE 2,037,188

RESILIENT CAR WHEEL

Russell Jay Wittmer, Cleveland Heights, Ohio, assignor to National Malleable and Steel Castings Company, Cleveland, Ohio, a corporation of Ohio Application November 3, 1931, Serial No. 572,794

2 Claims. (Cl. 295—11)

This invention relates to wheels, and more particularly to improvements in wheels, as for example, railway car wheels, in which resilient or yielding material, preferably rubber, is interposed between the tread and the axle.

An object of the invention is, accordingly, to provide improved constructions of this character which are simple and inexpensive to manufacture and assemble, besides being sturdy and durable. More specifically, one object is to provide a car wheel in which the portion adjacent the tread carries the portion adjacent the hub preferably solely by means of resilient or yielding material operatively interposed therebetween, under initial compression and adjacent the hub. Another object is to embody in such wheels the desired resiliency and load sustainability, while avoiding the use of excessive quantities of the yielding material, and at the same time to prolong the life of the material. A further object is to provide for cushioning the normal torque between the axle and tread, as under conditions when the car is traveling at a constant speed, but for relieving the cushioning material of any excessive torsional forces. Still another object is to provide such a construction which is capable of cushioning shocks in every direction. Other objects will appear as the description proceeds.

Constructions exemplifying my invention will now be descrbed in connection with the accompanying drawings, wherein:

Fig. 1 is a side elevation, partly in section, of a preferred form of car wheel in accordance with the present invention;

Fig. 2 is a rear elevation of the wheel shown in Fig. 1, looking from the right;

Figs. 3 and 4 are views similar to Figs. 1 and 2, respectively, showing a modified embodiment of the invention.

Referring, first, to Figs. 1 and 2, there is shown a wheel preferably composed of a tread member 5, including a web portion 6, and a hub member 7 having an opening 8 for reception of an axle (not shown). The web portion 6 is preferably annular and is shown as having a cylindrical wall 9 which is preferably widened laterally beyond the web proper and parallel to the axis of the wheel. The hub member is also preferably of generally cylindrical shape, and is shown provided with an outer wall or surface 10 adapted to lie within the wall 9, spaced therefrom, and parallel thereto. In order to provide a cushioning or yielding connection between the member 5 and the member 7, there is inserted between the walls 9 and 10 resilient or yielding material, such as rubber, which is preferably assembled in such a manner as to be in a highly stressed condition. One highly satisfactory manner of positioning the cushioning material between the walls 9 and 10, is to employ a tube 11 of metal or other suitable material into which a cylinder of rubber 12, normally too large in diameter for the tube, but of considerably shorter length, is inserted by means of pressure and some convenient funnel-shaped device. A second tube 13 whose outside diameter is larger than the diameter of a hole in the rubber element may then be assembled within the rubber with the aid of a conical wedge or expander which forces the rubber to an internal diameter sufficient to accommodate the tube 13. However, it may be noted that the rubber may be deformed any desired amount from its original shape, limited only by its inherent properties, and when assembled as described, is under what is termed an initial stress or, in other words, is stressed a predetermined amount prior to its operation as a cushioning device in the structure in which it is employed. It has been found that rubber under initial stress can carry much greater loads than rubber in its normal unstressed condition.

The tube 11 is preferably of such outside diameter and length with respect to wall 9 that it may be pressed or otherwise inserted thereinto, and when inserted will firmly seat therewithin. The tube 13 is similarly adapted to firmly engage the outer wall 10 of the hub or axle receiving member 7. The member 7 is preferably provided with a circular flange 14 in a plane generally perpendicular to the axis of the wheel, and lying at the inside of the wheel. This flange is advantageously spaced from the tread member 5 and from the tubes 11 and 13, and a washer 15 of rubber, asbestos, or the like, may be inserted, if desired, in such space in order to cushion lateral thrusts and prevent metal to metal contacts at these points, thus eliminating noise due to severe lateral displacements.

In the construction described, the rubber or other cushioning material completely insulates the two parts of the wheel, and is capable of cushioning movements of the tread member 5 with respect to the axle in every direction. That is, vertical movement of the wheel tread member with respect to the axle will be cushioned, as well as lateral thrusts, and torque, for the rubber is free to yield in any direction. It will be appreciated that as the rubber is held in place merely by the grip of the wheel on the tubes and the rubber, a very severe torque, as when the brakes are applied, might result in displacing, tearing or otherwise injuring the cushioning material. In order to prevent too great force from being applied to the cushioning material, there are shown formed on the member 5 lugs 16 which are adapted to cooperate with lugs 17, on either side thereof, and secured to, or preferably formed on, the member 7. The lugs 17 may be inclined toward the member 5 and extend from the flange 14, as shown. These lugs 17 are arranged so that they are normally spaced from the sides of lugs 16, to provide a slight clearance, so that, under ordinary conditions, such as when the vehicle is progressing at a uniform rate of speed and on the level, the lugs 16 and 17 will be out of contact, the forces all being applied between the hub member and the tread member through the rubber. Metal to metal contact under these conditions may thus be eliminated. However, under rapid acceleration, when going up a steep grade, or during application of the brakes, upon rotation of member 7 with respect to member 5, a given amount, the lugs 16 will come up against the lugs 17 on one side or the other, so that the rubber will be relieved of any excessive forces. The lugs 17 are shown spaced from the member 5 so as to permit lateral and rocking movements of the members 5 and 7 with respect to one another. The location of the rubber 12 relatively near the axle as compared to the tread of the wheel, is highly desirable in order that the heat generated near the tread, particularly by the brakes, shall not be transmitted to the rubber, and cause deterioration of the same.

While there are shown four lugs 16 and four pair of lugs 17, it will be understood that any suitable number of such lugs can be used, that the lugs 16 and 17 could be on the opposite members, respectively, from those on which they are shown, and that their shape and location may be considerably varied within the scope of the invention. It is also apparent that resilient material may be positioned in the spaces between lugs 16 and 17 thereby preventing metal to metal contact therebetween.

When wheels of the present character are used on street railway cars or similar cars in which the wheels are driven by electricity, as well as in those in which the wheels operate block system traffic signals, it is necessary to connect the two wheel members by means of a cable 18 of conducting material which is preferably flexible and secured to the members at suitable points, as between the flange 14 and the other member.

In the modified construction shown in Figs. 3 and 4, the wheel is generally the same as in Figs. 1 and 2, save that the tubes 11 and 13 have been omitted and the rubber placed under an initial stress directly between the members 5 and 7. In this construction, the rubber washer 15 is shown omitted because in placing the rubber cylinder 12 in position, it is generally necessary to push it onto the member on which it seats further than its final position, since it snaps back a little, and it is not desirable to have it overhang the member. In this construction, the flange 14 is simply spaced from the member 5. Also the lugs 17' are shown generally perpendicular to the flange 14 instead of being inclined. Of course, if desired, a rubber washer may be placed between the portion 9 and the flange 14, and the washer 15 may be omitted in the form of the invention shown in Figs. 1 and 2.

In the present constructions, the usual lateral thrusts will be taken care of by the rubber and the tight fit of the parts with which it cooperates. However, excessive outward thrusts of the axle, to which the hub members are secured, will be taken by the flange 14 or lugs 17 (17') abutting against the member 5, which has the usual rail engaging flange.

It may be noted that when a car, equipped with axles secured to wheels in accordance with the invention, rounds a curve, the tread on one wheel will first turn a slight amount with respect to the axle, but the lugs 16 and 17 (17') will then engage one another and the wheel will, as far as torque is concerned, thereafter behave similarly to a solid wheel.

The present invention thus provides a car wheel in which the part adjacent the tread is cushioned for movement in every direction with respect to the part adjacent the axle, that is to say, vertically, laterally, through rotation, and even rocking. Moreover, the amount of rubber in the wheel for embodying in it the desired properties is not so large as to make the wheel unstable, is maintained in position without the need of complicated constructions, and is insulated from the heat generated. Furthermore, in this construction noise due to operation of the wheel is damped out and vibrations due, for instance, to a rough track are not transmitted to the axle or parts carried thereby. At the same time, the construction is, as indicated above, easy to manufacture and durable, for the rubber may even outlive the tread portion of the wheel.

While the invention has been described in connection with a car wheel, it will be appreciated that it is also applicable to other types of rotating members, such as gears, pulleys and flexible connections between shafts. It may also be noted that the terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

What I claim is:

1. In a car wheel, a generally annular member including a tread and a web, a hub member, opposed surfaces formed on the members, yielding material under initial stress operatively interposed between the surfaces to enable the members to revolve, one relative to the other, said material being initially elongated in a direction parallel to the axis of the wheel, a flange on the hub member, said flange lying in a plane generally perpendicular to the axis of the wheel and at the inner side thereof, and yielding material operatively interposed between said flange and web.

2. In a car wheel, a generally annular member including a tread and a web, a hub member, opposed surfaces formed on the members, yielding material under initial stress operatively interposed between the surfaces to enable the members to revolve, one relative to the other, said material being under initial radial compression and under initial elongation in a direction parallel to the axis of the wheel, a flange extending radially from the hub member, yielding material operatively interposed between said flange and web, and means for causing the said members to revolve together after predetermined relative movement.

RUSSELL JAY WITTMER.